(12) United States Patent
Bradford

(10) Patent No.: US 9,691,240 B2
(45) Date of Patent: Jun. 27, 2017

(54) FLOOR COVERING SYSTEM WITH SENSORS

(71) Applicant: Interface, Inc., Atlanta, GA (US)

(72) Inventor: John Proctor Bradford, LaGrange, GA (US)

(73) Assignee: Interface, Inc., Atlanta, GA (US)

(*) Notice: Subject to any disclaimer, the term of this patent is extended or adjusted under 35 U.S.C. 154(b) by 0 days.

(21) Appl. No.: 15/003,824

(22) Filed: Jan. 22, 2016

(65) Prior Publication Data

US 2016/0217664 A1   Jul. 28, 2016

Related U.S. Application Data

(60) Provisional application No. 62/106,253, filed on Jan. 22, 2015.

(51) Int. Cl.
  *G08B 21/00* (2006.01)
  *G08B 13/10* (2006.01)
  (Continued)

(52) U.S. Cl.
  CPC .............. *G08B 13/10* (2013.01); *E04F 15/02* (2013.01); *E04F 15/02044* (2013.01); *H04Q 9/00* (2013.01); *E04F 2015/02111* (2013.01); *G08B 21/043* (2013.01); *G08B 21/0423* (2013.01); *G08B 21/0492* (2013.01); *H04Q 2209/47* (2013.01)

(58) Field of Classification Search
  CPC combination set(s) only.
  See application file for complete search history.

(56) References Cited

U.S. PATENT DOCUMENTS

| 406,866 A | 7/1889 | Atwater |
| 833,571 A | 10/1906 | Bailey et al. |

(Continued)

FOREIGN PATENT DOCUMENTS

| AT | 360217 | 12/1980 |
| AU | 2003265409 | 3/2004 |

(Continued)

OTHER PUBLICATIONS

Breaking New Ground in Flooring. Tacfast systems international website, www.tacfastsystems.com, downloaded on, Mar. 3, 2004, 1 page.

(Continued)

*Primary Examiner* — Travis Hunnings
(74) *Attorney, Agent, or Firm* — Kilpatrick Townsend & Stockton LLP

(57) ABSTRACT

A floor covering system can include sensors below a top surface of a floor covering and that can communicate data to a controller for monitoring events occurring in the room with the floor covering. The sensors can include a wireless transmitter associated with a tile connector, a pressure sensor, and a force sensor. The tile connector is positioned between a floor and a floor covering to connect tiles of the floor covering together. The pressure sensor is positioned between the floor and the floor covering. The force sensor is positioned between the floor and the floor covering. The controller is configured for receiving data from the pressure sensor, the wireless transmitter, and the force sensor.

19 Claims, 4 Drawing Sheets

(51) Int. Cl.
  *H04Q 9/00* (2006.01)
  *E04F 15/02* (2006.01)
  *G08B 21/04* (2006.01)

(56) References Cited

U.S. PATENT DOCUMENTS

| | | |
|---|---|---|
| 1,685,362 A | 9/1928 | Joseph |
| 1,711,149 A | 4/1929 | Joseph |
| 2,042,692 A | 6/1936 | Wurzburg |
| 2,250,669 A | 7/1941 | Jamgotchian |
| 2,367,536 A | 1/1945 | Spitzli |
| 2,522,114 A | 5/1949 | Goddard |
| 2,647,850 A | 8/1953 | Reinhard |
| 2,702,919 A | 3/1955 | Judge |
| 2,709,826 A | 6/1955 | Reinhard |
| 2,726,419 A | 12/1955 | Saks et al. |
| 3,083,393 A | 4/1963 | Nappi |
| 3,120,083 A | 2/1964 | Dahlberg et al. |
| 3,241,662 A | 3/1966 | Robinson et al. |
| 3,271,217 A | 9/1966 | Mapson |
| 3,494,006 A | 2/1970 | Brumlik |
| 3,538,536 A | 11/1970 | Pecorella |
| 3,558,384 A | 1/1971 | Ronning |
| 3,558,385 A | 1/1971 | Ronning |
| 3,558,386 A | 1/1971 | Ronning |
| 3,579,941 A | 5/1971 | Tibbals |
| 3,696,459 A | 10/1972 | Kucera et al. |
| 3,712,845 A | 1/1973 | Hartung |
| 3,748,211 A | 7/1973 | Hoopengardner |
| 3,788,941 A | 1/1974 | Kupits |
| 3,819,773 A | 6/1974 | Pears |
| 3,858,269 A | 1/1975 | Sutton et al. |
| 3,928,690 A | 12/1975 | Settineri et al. |
| 2,969,564 A | 7/1976 | Henderson |
| 3,969,564 A | 7/1976 | Carder |
| 4,012,544 A | 3/1977 | Richards |
| 4,114,346 A | 9/1978 | Kelly |
| 4,152,473 A | 5/1979 | Layman |
| 4,196,254 A | 4/1980 | Puskadi |
| 4,242,389 A | 12/1980 | Howell |
| 4,322,516 A | 3/1982 | Wiest et al. |
| 4,340,633 A | 7/1982 | Robbins, Jr. |
| 4,489,115 A | 12/1984 | Layman et al. |
| 4,546,024 A | 10/1985 | Brown |
| 4,557,774 A | 12/1985 | Hoopengardner |
| 4,561,232 A | 12/1985 | Gladden, Jr. et al. |
| 4,562,938 A | 1/1986 | Loder |
| 4,564,546 A | 1/1986 | Jones |
| 4,571,363 A | 2/1986 | Culbertson et al. |
| 4,680,209 A | 7/1987 | Zybko et al. |
| 4,695,493 A | 9/1987 | Friedlander et al. |
| 4,702,948 A | 10/1987 | Sieber-Gadient |
| 4,757,652 A | 7/1988 | Kalkanoglu |
| 4,769,895 A | 9/1988 | Parkins |
| 4,822,658 A | 4/1989 | Pacione |
| 4,824,498 A | 4/1989 | Goodwin et al. |
| 4,888,581 A * | 12/1989 | Guscott .............. G08B 21/0469 200/61.93 |
| 4,920,720 A | 5/1990 | LaBianca |
| 4,947,602 A | 8/1990 | Pollasky |
| 4,966,788 A | 10/1990 | Pell |
| 4,988,551 A | 1/1991 | Zegler |
| 5,012,590 A | 5/1991 | Wagner et al. |
| 5,018,235 A | 5/1991 | Stamatiou et al. |
| 5,034,258 A | 7/1991 | Grace |
| 5,096,764 A | 3/1992 | Terry et al. |
| 5,114,774 A | 5/1992 | Maxim, Jr. |
| 5,116,439 A | 5/1992 | Raus |
| 5,120,587 A | 6/1992 | McDermott, III et al. |
| 5,191,692 A | 3/1993 | Pacione |
| 5,205,091 A | 4/1993 | Brown |
| 5,217,522 A | 6/1993 | Riebel et al. |
| 5,217,552 A | 6/1993 | Miyajima et al. |
| 5,304,410 A | 4/1994 | Webster |
| 5,401,547 A | 3/1995 | Blackwell et al. |
| 5,422,156 A | 6/1995 | Billarant |
| 5,438,809 A | 8/1995 | Ehrlich |
| 5,447,004 A | 9/1995 | Vrnak |
| 5,504,136 A | 4/1996 | Davis et al. |
| 5,522,187 A | 6/1996 | Bogaerts |
| 5,564,251 A | 10/1996 | Van Bers |
| 5,609,933 A | 3/1997 | Stepanek |
| 5,609,993 A | 3/1997 | Hase et al. |
| 5,616,803 A | 4/1997 | Nomoto et al. |
| 5,634,309 A | 6/1997 | Polen |
| 5,672,404 A | 9/1997 | Callahan, Jr. et al. |
| 5,683,780 A | 11/1997 | Rodger et al. |
| 5,691,027 A | 11/1997 | Eckhardt et al. |
| 5,706,623 A | 1/1998 | Brown |
| 5,753,336 A | 5/1998 | Stull |
| 5,761,765 A | 6/1998 | Fuzzell |
| 5,763,040 A | 6/1998 | Murphy et al. |
| 5,822,828 A | 10/1998 | Berard et al. |
| 5,834,081 A | 11/1998 | Fanti |
| 5,863,632 A | 1/1999 | Bisker |
| 5,888,335 A | 3/1999 | Kobe et al. |
| 5,931,354 A | 8/1999 | Braud et al. |
| 5,958,540 A | 9/1999 | Berard et al. |
| 5,995,884 A | 11/1999 | Allen et al. |
| 6,068,904 A | 5/2000 | Stearns |
| 6,083,596 A | 7/2000 | Pacione |
| 6,093,469 A | 7/2000 | Callas |
| 6,216,315 B1 | 4/2001 | Fuzzell |
| 6,253,526 B1 | 7/2001 | Murphy et al. |
| 6,260,326 B1 | 7/2001 | Muller-Hartburg |
| 6,298,624 B1 | 10/2001 | Pacione |
| 6,306,477 B1 | 10/2001 | Pacione |
| 6,333,073 B1 | 12/2001 | Nelson et al. |
| 6,426,129 B1 | 7/2002 | Kalwara et al. |
| 6,460,303 B1 | 10/2002 | Pacione |
| 6,475,594 B2 | 11/2002 | Johnston et al. |
| 6,515,586 B1 * | 2/2003 | Wymore ................ G08B 13/10 307/116 |
| 6,586,066 B1 | 7/2003 | Buckwalter et al. |
| 6,599,599 B1 | 7/2003 | Buckwater et al. |
| 6,694,682 B2 | 2/2004 | Fanti |
| 6,694,689 B1 | 2/2004 | Scott et al. |
| 6,701,685 B2 | 3/2004 | Rippey |
| 6,756,100 B2 | 6/2004 | Pearson et al. |
| 6,756,102 B1 | 6/2004 | Galo |
| 6,803,090 B2 | 10/2004 | Castiglione et al. |
| 6,841,216 B2 | 1/2005 | Daniel et al. |
| 6,849,317 B1 | 2/2005 | Oakey et al. |
| 6,850,024 B2 | 2/2005 | Peless et al. |
| 6,854,241 B1 | 2/2005 | Pelosi, Jr. |
| 6,861,118 B2 | 3/2005 | Kobayashi et al. |
| 6,866,928 B2 | 3/2005 | Narum et al. |
| 6,888,459 B2 | 5/2005 | Stilp |
| 6,908,656 B2 | 6/2005 | Daniel et al. |
| 6,977,579 B2 | 12/2005 | Gilfix et al. |
| 6,984,952 B2 | 1/2006 | Peless et al. |
| 7,039,522 B2 | 5/2006 | Landau |
| 7,083,841 B2 | 8/2006 | Oakey et al. |
| 7,148,803 B2 | 12/2006 | Bandy et al. |
| 7,225,980 B2 | 6/2007 | Ku et al. |
| 7,242,303 B2 | 7/2007 | Patel et al. |
| 7,245,215 B2 | 7/2007 | Göllü et al. |
| 7,297,385 B2 | 11/2007 | Daniel et al. |
| 7,339,523 B2 | 3/2008 | Bye |
| 7,350,443 B2 | 4/2008 | Oakey et al. |
| 7,464,510 B2 | 12/2008 | Scott et al. |
| 7,601,413 B2 | 10/2009 | Daniel et al. |
| 7,672,780 B2 | 3/2010 | Kim |
| 7,721,502 B2 | 5/2010 | Scott et al. |
| 7,757,457 B2 | 7/2010 | Zah et al. |
| 8,220,221 B2 | 7/2012 | Gray et al. |
| 8,381,473 B2 | 2/2013 | Scott et al. |
| 8,434,282 B2 | 5/2013 | Scott et al. |
| 8,442,800 B2 * | 5/2013 | Lindstrom ........... G08B 21/043 244/3.1 |
| 8,468,771 B2 | 6/2013 | Gray et al. |
| 8,468,772 B2 | 6/2013 | Oakey et al. |
| 9,085,902 B2 | 7/2015 | Scott et al. |
| 2002/0140393 A1 | 10/2002 | Peless et al. |

(56) References Cited

U.S. PATENT DOCUMENTS

| | | |
|---|---|---|
| 2003/0003263 A1 | 1/2003 | Smith |
| 2003/0071051 A1 | 4/2003 | Martinsen |
| 2003/0104205 A1 | 6/2003 | Brodeur, Jr. et al. |
| 2003/0180091 A1 | 9/2003 | Stridsman |
| 2004/0062899 A1 | 4/2004 | Kobayashi et al. |
| 2004/0093811 A1 | 5/2004 | Oakey et al. |
| 2004/0095244 A1 | 5/2004 | Conwell et al. |
| 2004/0185682 A1 | 9/2004 | Foulke et al. |
| 2004/0258870 A1 | 12/2004 | Oakey et al. |
| 2005/0007057 A1 | 1/2005 | Peless et al. |
| 2005/0059308 A1 | 3/2005 | Parsons |
| 2005/0089678 A1 | 4/2005 | Mead |
| 2005/0099291 A1 | 5/2005 | Landau |
| 2005/0099306 A1 | 5/2005 | Gilfix et al. |
| 2005/0223664 A1 | 10/2005 | Gardner |
| 2005/0229534 A1 | 10/2005 | Scott et al. |
| 2005/0261571 A1 | 11/2005 | Willis et al. |
| 2006/0010804 A1 | 1/2006 | Gray et al. |
| 2006/0048797 A1 | 3/2006 | Jung et al. |
| 2006/0107617 A1 | 5/2006 | Scott et al. |
| 2006/0162269 A1 | 7/2006 | Pacione et al. |
| 2006/0164236 A1 | 7/2006 | Siegl et al. |
| 2006/0171570 A1* | 8/2006 | Brendley ............... G08B 13/10 382/115 |
| 2006/0261951 A1 | 11/2006 | Koemer et al. |
| 2006/0293794 A1 | 12/2006 | Harwig et al. |
| 2007/0061075 A1 | 3/2007 | Kim |
| 2007/0069021 A1 | 3/2007 | Elrod et al. |
| 2007/0126634 A1 | 6/2007 | Bye |
| 2007/0151184 A1 | 7/2007 | Wise et al. |
| 2008/0213529 A1* | 9/2008 | Gray ................. A47G 27/0475 428/44 |
| 2009/0045918 A1 | 2/2009 | Droesler et al. |
| 2009/0094919 A1 | 4/2009 | Scott et al. |
| 2009/0115610 A1* | 5/2009 | Steinhage ........... G07C 9/00111 340/572.1 |
| 2010/0024329 A1 | 2/2010 | Gray et al. |
| 2010/0051169 A1 | 3/2010 | Sheppard et al. |
| 2010/0176189 A1 | 7/2010 | Gray et al. |
| 2010/0251641 A1 | 10/2010 | Gallagher et al. |
| 2011/0061328 A1 | 3/2011 | Sandy et al. |
| 2011/0107720 A1 | 5/2011 | Oakey et al. |
| 2013/0014460 A1 | 1/2013 | Scott et al. |
| 2013/0097834 A1 | 4/2013 | Pacione et al. |
| 2013/0232900 A1 | 9/2013 | Scott et al. |
| 2013/0263553 A1 | 10/2013 | Scott et al. |

FOREIGN PATENT DOCUMENTS

| | | |
|---|---|---|
| AU | 2005295322 | 4/2006 |
| AU | 2008230828 | 10/2008 |
| AU | 2011200866 | 3/2011 |
| AU | 2005295322 | 5/2011 |
| AU | 2013206537 | 7/2013 |
| AU | 2011200866 | 10/2013 |
| AU | 2014201289 | 3/2014 |
| AU | 2008230828 | 5/2014 |
| AU | 2013206537 | 1/2015 |
| AU | 2014201289 | 10/2015 |
| AU | 2015255196 | 11/2015 |
| BR | PI03134954 | 7/2005 |
| BR | PI05181658 | 11/2008 |
| BR | PI0809431 | 9/2014 |
| CA | 1267966 | 8/1991 |
| CA | 2421763 | 3/2002 |
| CA | 2495101 | 2/2004 |
| CA | 2583532 | 4/2006 |
| CA | 2679004 | 10/2008 |
| CA | 2583532 | 7/2012 |
| CA | 2679004 | 1/2016 |
| CN | 2116040 | 9/1992 |
| CN | 1787768 | 6/2006 |
| CN | 101064350 | 12/2007 |
| CN | 201139396 | 10/2008 |
| CN | 101415544 | 4/2009 |
| CN | 100536729 | 9/2009 |
| CN | 101614066 | 12/2009 |
| CN | 101646737 | 2/2010 |
| CN | 101614066 | 1/2013 |
| CN | 103074985 | 5/2013 |
| CN | 101646737 | 7/2013 |
| CN | 103074985 | 9/2015 |
| DE | 1913002 | 3/1970 |
| DE | 2027415 | 12/1971 |
| DE | 2304392 | 8/1973 |
| DE | 2649644 | 5/1978 |
| DE | 19533090 | 3/1997 |
| DE | 10001551 | 7/2001 |
| DE | 20111113 | 10/2001 |
| DE | 102004007595 | 9/2005 |
| EP | 0017986 | 10/1980 |
| EP | 0044533 | 1/1982 |
| EP | 0237657 | 9/1987 |
| EP | 0239041 | 9/1987 |
| EP | 0942111 | 9/1999 |
| EP | 1160076 | 12/2001 |
| EP | 1313079 | 5/2003 |
| EP | 1325202 | 7/2003 |
| EP | 1325202 | 6/2006 |
| EP | 1799935 | 6/2007 |
| EP | 2129735 | 12/2009 |
| EP | 2258908 | 12/2010 |
| EP | 2258909 | 12/2010 |
| EP | 2374855 | 10/2011 |
| EP | 2374856 | 10/2011 |
| EP | 2374857 | 10/2011 |
| EP | 2374856 | 11/2011 |
| EP | 2374857 | 11/2011 |
| EP | 2417311 | 2/2012 |
| EP | 2554616 | 2/2013 |
| EP | 2554616 | 6/2013 |
| EP | 2258909 | 4/2014 |
| EP | 2374856 | 7/2014 |
| EP | 2374857 | 7/2015 |
| FR | 1239859 | 8/1960 |
| FR | 2278676 | 2/1976 |
| FR | 2582210 | 11/1986 |
| FR | 2903707 | 1/2008 |
| GB | 1350767 | 4/1974 |
| GB | 2113993 | 8/1983 |
| GB | 2182961 | 5/1987 |
| GB | 2299019 | 9/1996 |
| GB | 2342040 | 4/2000 |
| GB | 2389075 | 12/2003 |
| HK | 1114890 | 4/2010 |
| JP | 4930420 | 8/1974 |
| JP | 55086714 | 6/1980 |
| JP | 62010181 | 1/1987 |
| JP | 63017700 | 4/1988 |
| JP | 01020252 | 4/1989 |
| JP | 02038152 | 2/1990 |
| JP | 05163825 | 6/1993 |
| JP | 07076333 | 8/1995 |
| JP | 07259305 | 10/1995 |
| JP | 09209545 | 8/1997 |
| JP | 09209546 | 8/1997 |
| JP | 09279106 | 10/1997 |
| JP | 11270115 | 10/1999 |
| JP | 2000265649 | 9/2000 |
| JP | 2000328759 | 11/2000 |
| JP | 2001115631 | 4/2001 |
| JP | 2004003191 | 1/2004 |
| JP | 2005538760 | 12/2005 |
| JP | 2008517190 | 5/2008 |
| JP | 2010523841 | 7/2010 |
| JP | 2011094478 | 5/2011 |
| JP | 4945452 | 3/2012 |
| JP | 2013177809 | 9/2013 |
| JP | 5489980 | 3/2014 |
| JP | 5616803 | 9/2014 |
| JP | 5735037 | 4/2015 |
| KR | 1020070068368 | 6/2007 |
| KR | 1020100014594 | 2/2010 |

(56) References Cited

FOREIGN PATENT DOCUMENTS

| | | |
|---|---|---|
| KR | 101417048 | 6/2014 |
| KR | 20140119768 | 10/2014 |
| KR | 101537917 | 7/2015 |
| KR | 101552737 | 9/2015 |
| MX | PA03002223 | 6/2003 |
| MX | 2007004405 | 4/2007 |
| MX | 285845 | 4/2011 |
| MX | 326198 | 12/2014 |
| MX | 327206 | 1/2015 |
| NL | 1028881 | 10/2006 |
| WO | 8601247 | 2/1986 |
| WO | 9810688 | 3/1998 |
| WO | 9820330 | 5/1998 |
| WO | 9835276 | 8/1998 |
| WO | 9955792 | 11/1999 |
| WO | 0047837 | 8/2000 |
| WO | 0075417 | 12/2000 |
| WO | 0225004 | 3/2002 |
| WO | 02025004 | 7/2002 |
| WO | 03060255 | 7/2003 |
| WO | 2004016848 | 2/2004 |
| WO | 2004016848 | 5/2004 |
| WO | 2004066795 | 8/2004 |
| WO | 2005071597 | 8/2005 |
| WO | 2005092632 | 10/2005 |
| WO | 2005112775 | 12/2005 |
| WO | 2005118273 | 12/2005 |
| WO | 2006044928 | 4/2006 |
| WO | 2006045819 | 5/2006 |
| WO | 2006065839 | 6/2006 |
| WO | 2006066299 | 6/2006 |
| WO | 2006565430 | 6/2006 |
| WO | 2006044928 | 8/2006 |
| WO | 2006096431 | 9/2006 |
| WO | 2006116528 | 11/2006 |
| WO | 2006128783 | 12/2006 |
| WO | 2007002708 | 1/2007 |
| WO | 2007018523 | 2/2007 |
| WO | 2007033980 | 3/2007 |
| WO | 2007072389 | 6/2007 |
| WO | 2007081823 | 7/2007 |
| WO | 2007098925 | 9/2007 |
| WO | 2008119003 | 10/2008 |
| WO | 2008119003 | 12/2008 |
| WO | 2010118084 | 10/2010 |
| WO | 2010144897 | 12/2010 |
| WO | 2010118084 | 3/2011 |
| WO | 2013028916 | 2/2013 |
| WO | 2016118797 | 7/2016 |

OTHER PUBLICATIONS

Carpet Bargains, http://web.archive.org/web/19990827025011/carpetbargains.com/index.htm, Retrieved Apr. 10, 2006, Apr. 10, 2006, 4 pages.
Definition of Merchandising, Merriam-Webster Online Dictionary [retrieved Apr. 10, 2006], http://webster.com/dictionary/merchandising, 2005-2006, 2 pages.
Patent Abstracts of Japan, vol. 004, No. 128 and JP55086714 (A) abstract (Jun. 30, 1980), Sep. 9, 1980.
Patent Abstracts of Japan, vol. 1997, No. 12 and JP09209546 (A) abstract (Aug. 12, 1997), Dec. 25, 1997.
Technical Data for 3M Scotch Pad Tape Pad 3750P, 3M Industrial Adhesives and Tapes Division Publication, Mar. 2003, 2 pages.
3M ScotchPad™ Label Protection Tape Pads 822, Technical Data Sheet, Feb. 2003, 2 pages.
PSA 101: Fundamentals of Pressure Sensitive Adhesive Tapes, Tape University 101 Course Materials, Pressure Sensitive Tape, Sep. 10-11, 2001, 43 pages.
Wolff TFV Carpet Tile Connector, Wolff GmbH, 1987, 2 pages.
U.S. Appl. No. 60/619,340, filed Oct. 15, 2004.
El-Zabadani et al., A Mobile Sensor Platform Approach to Sensing and Mapping Pervasive Spaces and Their Content, Mobile & Pervasive Computing Laboratory, CISE Dept., University of Florida, 2007, 17 pages.

\* cited by examiner

FLOOR COVERING SYSTEM WITH SENSORS

CROSS-REFERENCE TO RELATED APPLICATION

This claims the benefit of priority under 35 U.S.C. §119 (e) to U.S. Provisional Patent Application No. 62/106,253, titled "Floor Sensor Systems and Methods of Use" and filed Jan. 22, 2015, the entirety of which is hereby incorporated by reference herein.

TECHNICAL FIELD

The present disclosure relates generally to floor coverings. More specifically, but not by way of limitation, this disclosure relates to a floor covering system with intelligent sensors under a surface of a floor covering.

BACKGROUND

Sensing devices and systems continue to grow more elaborate, powerful, and ubiquitous. But, practical hurdles have hindered the commercialization and general use of systems employing sensing devices for floor surfaces. For example, sensing devices positioned on or under a floor covering may disrupt the smooth surface of the floor or provide obstacles or hazardous conditions for walkers and wheeled traffic. In addition, installing, positioning, powering, and monitoring such sensing devices has also presented challenges generally inhibiting the efficient, effective, and inexpensive use of sensing devices for floor surfaces.

SUMMARY

In one example, a floor covering system is provided. The floor covering system includes at least one tile connector with a wireless transmitter, a pressure sensor, a force sensor, and a controller. The tile connector is positionable between a floor and a floor covering to connect tiles of the floor covering together. The pressure sensor is positionable between the floor and the floor covering. The force sensor is positionable between the floor and the floor covering. The controller is configured for receiving data from the pressure sensor, the wireless transmitter, and the force sensor.

In another example, a floor installation is provided. The floor installation includes tiles forming a floor covering that covers at least part of a floor, at least one pressure sensor, and at least one force sensor. At least some of the tiles are connected together by tile connectors that are positioned between the tiles and the floor. The tile connectors include location-tracking sensors that are configured to provide location data to a controller. The pressure sensor is positioned between the floor and the floor covering and is configured to provide pressure data to the controller. The force sensor is positioned between the floor and the floor covering and is configured to provide force data to the controller.

In another example, a method is provided. Location data associated with an event occurring in a room is received from a wireless transmitter on a tile connector that connects tiles to form a floor covering for a floor of the room. The tile connector is between a top surface of the floor covering and the floor. Pressure data associated with the event occurring in the room is received from a pressure sensor positioned between the floor covering and the floor. Force data associated with the event occurring in the room is received from a force sensor positioned between the floor covering and the floor. The location data, the pressure data, and the force data are analyzed to determine the event is occurring. An alert is outputted to a user device to indicate that the event is occurring.

DETAILED DESCRIPTION

Figure 1:
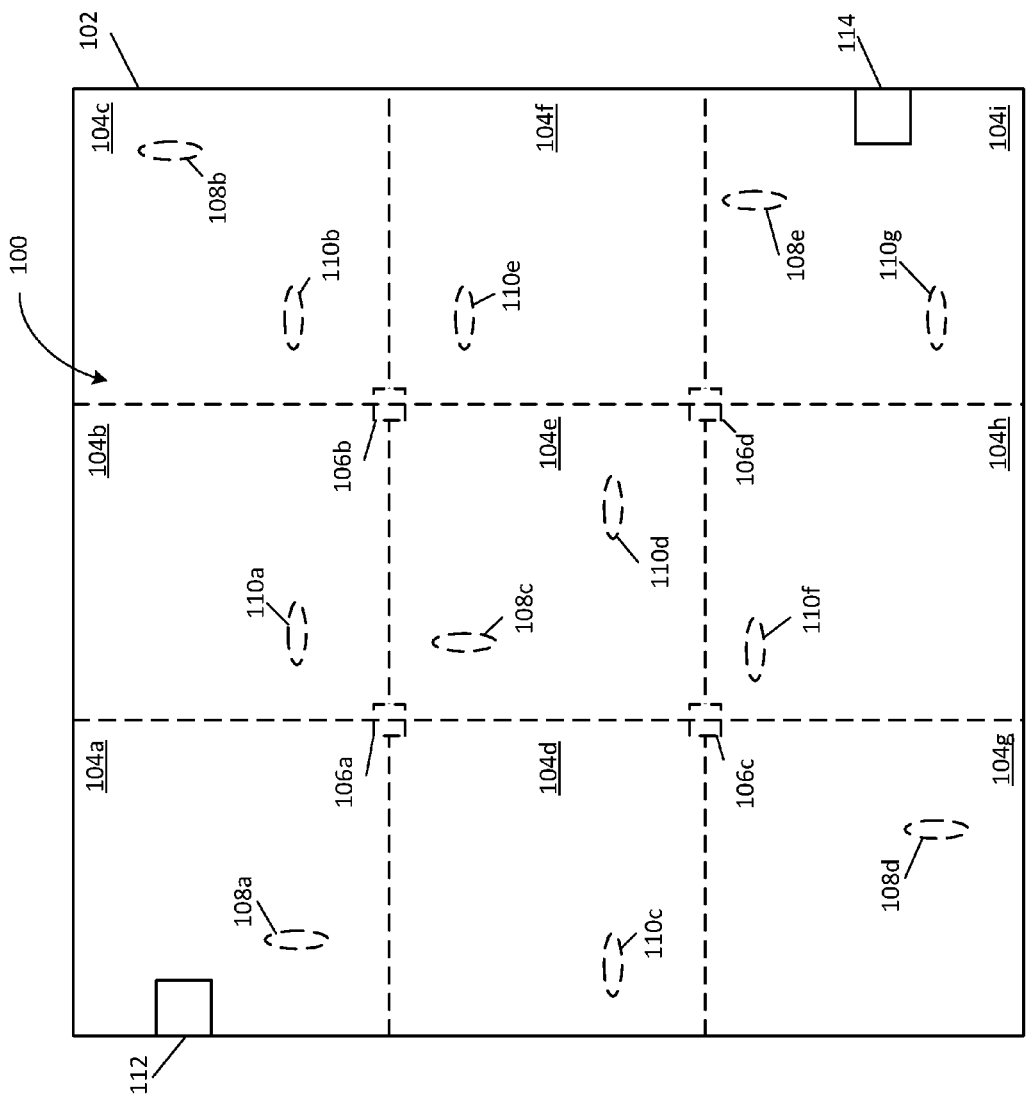
FIG. 1 is a plan view of a floor covering with a sensor system according to one example.

Certain aspects and features relate providing information collected from sensors of a floor covering system. The system can include sensors positioned within or under a floor covering and that provide information through a wired or wireless communications medium to a controller or data processing component. The controller or data processing component can collect data from the floor sensors and display or otherwise provide information to users based on the collected data. The data from the floor sensors may be combined with data from other sources, including but not limited to, data from wall sensors, ceiling sensors, other sensors within and external to the room with the floor, and other information from outside the room or facility where the floor is located. Examples of information from outside of a facility include, but are not limited to, information about triggered security alarms, weather alerts, police reports, information about persons or animals likely to be on a floor, etc.

The information from the floor sensors may be used to detect many types of events and objects. As examples, such sensors may detect and associate a series of footfall impacts that indicate that a person is walking, where the person is walking, and how fast the person is walking. The information may also be used to detect that a person has fallen to the floor. The sensor information may be used for other purposes, such as to detect that an unauthorized person is walking in a restricted area, that water has flooded a particular portion of a basement, or that a person has exited from a window. The information may additionally or alternatively be collected and used over time. Sensor information collected over time may be used to identify patterns and deviations from patterns. As examples, the information may be used to detect a person's behavioral patterns, provide warnings based on deviations from expected behavioral patterns, identify when a daily medicine user has not been to his medicine cabinet on a particular day, estimate facility usage rates (e.g., an average of thirty persons walk down a hallway per day), estimate expected floor replacement needs based on usage rates, among many other possible uses.

Sensors can transmit, send, or otherwise provide information to one or more data collecting components using various techniques. The provided information can include information collected by the sensors, information about the sensor's location, or any other appropriate information. In one example, sensors include a location-tracking sensor, a force sensor, and a pressure sensor. An example of a location-tracking sensor includes a radio-frequency identification (RFID) sensor. An example of a force sensor includes an accelerometer. An example of a pressure sensor includes a piezoelectric sensor. But other examples of each type of sensor can be used. RFID sensors may be tags that are read by one or more movable RFID readers. In some examples, sensors are equipped with communication capabilities for communicating with a Wi-Fi network. In another example, sensors are equipped with near field communication capabilities. Other existing and yet-to-be developed communication techniques may additionally or alternatively be used to facilitate communication of information from a sensor.

Sensors can be positioned at regular intervals throughout a flooring surface or at irregular intervals. In the case of carpet tiles, for example, sensors may be positioned at the corners of abutting tiles, at the center of each tile, at both the corners of abutting tiles and at the center of each tile, etc. Sensors may be positioned in greater concentrations in certain parts of a room or a building to facilitate a particular objective. For example, sensors may be more dense in a restricted area to facilitate greater security in that area than other areas of a building, or may be more dense in the portions of an assisted living facility in which falls by residents are more likely to occur or in which residents are less closely supervised. In carpet tile installations, a sensor can be used in small, regularly spaced, adhesive-based connectors that are also used to connect carpet tiles together, such as in Tactiles® connectors available from Interface, Inc. Sensors may be additionally or alternatively embedded in the backings of carpet tiles in an installation or in an underlayment that is used under carpet tiles or other floor coverings. Sensors may be used in installation environments in which there is little or no wet glue (for example, when incorporated in or used with the regularly spaced, adhesive-based connectors that are also used to connect carpet tiles together). Sensors may alternatively be configured to withstand glue and be used in installations of carpet tiles and other floor coverings in which adhesive is used to attach the floor covering to the underlying floor.

A system for providing information collected from floor sensors can use any type of sensor or combination of types of sensors that provides useful information. As examples, sensors can be used to detect or measure vibration, light, heat, moisture, pH, pressure, strain, force, etc. Data from the sensors can be sent in raw form or may be converted, compiled, translated, encrypted, or otherwise processed at the sensors prior to being sent to a collection device. Analog data may be converted into digital data, for example, to be provided via a digital Wi-Fi network connection to a data collection and analysis computer.

In one example, a connector for flooring tiles can include a wireless transmitter, such as an RFID sensor. Accelerometers and piezoelectric sensors can be positioned between the outer surface of the flooring and the floor and provide force data and pressure data, respectively. For example, accelerometers and piezoelectric sensors may be included with an underlayment, embedded in the flooring, or included on connectors. The RFID sensor may be an active transmitter or a passive transmitter that can transmit a signal wirelessly in response to a stimulus, such as a signal from an RFID reader. A controller or other system can receive the location data, the pressure data, and the force data, and use the data to monitor the room by, for example, detecting for events happening in the room.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a top, plan view of a floor covering 100 with a sensor system according to one example. The floor covering 100 covers all or substantially all of a floor in a room 102. Dotted lines in FIG. 1 depict components or edges of components that are below a top surface of the floor covering 100 and that are not seen from a top view of the room 102. The floor covering 100 is formed in modular form by tiles 104a-i. Although nine tiles 104a-i are shown, any number of tiles can be used. Furthermore, the tiles 104a-i may have the same shape and dimensions, or have a different shape or different dimensions. The floor covering 100 may be carpet or another type of flooring. The tiles 104a-i can be connected by tile connectors 106a-d, which may be Tactiles® connectors from Interface, Inc. Each of the tile connectors 106a-d can connect tiles 104a-i together by, for example, having an adhesive layer over which two or more of the tiles 104a-i are laid and couple to the tile connector.

The sensor system can include location-tracking sensors that are wireless transmitters (not shown in FIG. 1), force sensors that are accelerometers 108a-e, pressure sensors that are piezoelectric sensors 110a-g, a controller system 112, and a power source system 114. The wireless transmitters may be RFID sensors that are positioned on, or included with, the tile connectors 106a-d that are below the top surface of the floor covering 100 and between the floor covering 100 and the floor of the room 102. The controller system 112 and the power source system 114 can be positioned above the surface of the floor covering 100 and can communicate with or provide power to the other components over wires (not shown) or wirelessly. In some examples, the controller system 112 and the power source system 114 are positioned external to the room 102. In some implementations, the controller system 112 and the power source system 114 may be collocated, such as by being sub-systems within an overall system.

The accelerometers 108a-e and the piezoelectric sensors 110a-g are positioned below the top surface of the floor covering 100. For example, the accelerometers 108a-e and the piezoelectric sensors 110a-g may be included in or with an underlayment that is positioned between the floor covering 100 and the floor or embedded in, or otherwise associated with, the tiles 104a-i. In other examples, the accelerometers 108a-e and the piezoelectric sensors 110a-g are on or included with the tile connectors 106a-d. Although a selected number of each of the accelerometers 108a-e and the piezoelectric sensors 110a-g are shown, any number of each can be used. The number of piezoelectric sensors 110a-g is greater than the number of accelerometers 108a-e in FIG. 1, but in other examples, the number of accelerometers is greater than the number of piezoelectric sensors used or the number of each is the same. Furthermore, the placement of the accelerometers 108a-e and the piezoelectric sensors 110a-g can vary (by being in a pattern or a non-pattern), depending on the desired coverage area.

Although the floor covering 100 is formed using tiles 104a-i in FIG. 1, in other examples a floor covering can be used that is not modular or formed using tiles. In those examples, the wireless transmitters may be included in a pattern or otherwise positioned below the top surface of the floor covering.

The wireless transmitters can form an array of RFID sensors that can provide location information for an event that occurred in the room 102. In some examples, the accelerometers 108a-e and the piezoelectric sensors 110a-g can include or be associated with one or more wireless transmitters for communicating data. The accelerometers 108a-e can provide, wirelessly or via a wired communication, data about the force of the event. The piezoelectric sensors 110a-g can provide, wirelessly or via a wired connection, pressure data about the event. The data—location data, force data, and pressure data—can be received by the controller system 112, which may be positioned in the room 102 or external to the room 102. In other aspects, the controller system 112 includes a controller subsystem and a data processing subsystem that may or may not be collocated together. The controller system 112 can use the data to monitor the room by analyzing the data and outputting an indication that the event occurred, or otherwise allow the room 102 to be monitored with more accuracy and for more events, in real time or substantially in real time, while allowing the surface of the floor covering 100 to remain smooth. In some aspects, the piezoelectric sensors 110a-g can output power for the accelerometers 108a-e or the wireless transmitters (if needed) in response to impacts from people or animals walking on the flooring.

A system for providing information collected from floor sensors, such as wireless transmitters, accelerometers 108a-e, and piezoelectric sensors 110a-g, can use the locations of individual sensors to enhance the character of the data provided by the sensors. For example, if the locations of the individual sensors are known, then the location of moisture, human falls, and other events can be pinpointed. Sensors may be assigned locations prior to being installed and then installed in that predetermined location. This can, however, be time consuming, subject to human error, or require more skill on the part of the installation personnel.

Sensors may alternatively be installed first and then assigned locations based on the actual locations of the sensors. In one example, sensor locations for at least some of the sensors are detected by a device that identifies the actual location of a sensor and assigns that location to the sensor. The assignment may involve associating the location with the sensor in information stored on the sensor itself or in a data store separate from the sensor. A portable device (e.g., an RFID reader for wireless transmitters that are RFID sensors) may be used to detect sensors, identify floor layout, identify sensor location relative to that floor layout, or assign the detected locations to the sensors.

Each sensor may store unique information that represents the sensor's identity or the sensor's location. For example, each sensor may store longitudinal and latitudinal location information, floor number, building number, etc. In one embodiment, sensors are provided with radio frequency (RF) chips or Wi-Fi tags that are initially installed blank and subsequently assigned a digital code that represents the sensor's location or identity. A portable device may be used to assign such information to a group of sensors after the sensors are installed. The result of such an assignment process may provide sensors that individually store accurate identity and location information and a mapping of the locations of the group of sensors relative to a layout of the room. The layout of the room may be previously known, detected by a separate process, or detected as part of the same process that assigns the sensor identity and location information. For example, a robot may traverse an area detecting sensors and scanning for open space, walls, obstacles, etc. A graphic showing layout and sensor locations may be produced, stored, and used in later detection processes (e.g., to identify that the back left corner of a basement has flooded). The graphic of a room or floor layout with sensor locations may be used as part of the output of a detection system, allowing a user to quickly understand which sensors have provided the relevant information, e.g., to see where an elderly resident has fallen within the resident's room.

A portable assigning or mapping device used to assign identity or location information to sensors, or used to identify floor or room layout, may use multiple types of input to improve its accuracy with respect to knowing its own location, assigning location information to sensors, and identifying locations of walls and obstacles. As examples, a portable assigning or mapping device may identify its own location using one or more of a wheel movement tracking technique (e.g., determining device location based on how much one or more of the device's wheels have turned), by detecting proximity to items at known locations (e.g., where a device is directly over an RFID tag or Wi-Fi tag positioned at a known location), by receiving information from external systems (e.g., a camera tracking the device's location and sending it to the device), or by any other suitable location identifying technique. A portable assigning or mapping device may detect walls and obstacles using one or more of an infrared camera, by using physical arms or other detection elements, or by any other wall/obstacle detection technique. As a portable assigning or mapping device moves, it can obtain additional data points that allow it to determine locations of sensors, walls and obstacles. For example, the assigning or mapping device may detect a signal from a sensor. As the device moves, the device perceives that signal as having different strengths based on how close it is to the sensor in a given location and this information can be used to determine a relatively precise location of the sensor.

A portable assigning or mapping device may be controlled by a user via remote control or otherwise or may be self-directed some or all of the time. In one example, a portable assigning or mapping device includes wheels that move the device around on a floor, a wheel tracking component that determines changes in the wheels (radian changes, etc.), an infrared sensor that scans or otherwise detects walls and obstacles around the device, a location identifying component, and a writer component, for example, for writing sensor RF tags or Wi-Fi tags. Some or all of the functions may be accomplished by a processor at the device executing computing instructions stored in memory at the device. A transmitter may be used to write sensor RF tags or Wi-Fi tags.

In one embodiment, the device's location is determined using a single position technique based on triangulation techniques. For example, an infrared sensor may detect the same portion of a wall three or more times as the device moves and use this information to confirm the device's location relative to the wall.

In one embodiment, the device's location is confirmed by comparing information from multiple sources. For example, the location on of the devices may be determined based on measuring how much the device wheels have turned and this determined location may be checked against an expectation provided by an infrared camera. As a specific example, the device may determine that it is at a particular location "A" (that is four feet from a wall) and an infrared camera may detect that the wall is actually five feet away. The system can use this mismatch to generate a warning or initiate an appropriate correction (calibration, starting over, etc.). Matching values, on the other hand, confirm the accuracy of the determined location.

In one embodiment, a portable layout detection device is used to determine a layout of a room, floor, or building. This layout may better represent the "as-built" or current layout of room, floor, or building than the original architectural plans and may be able to do so quickly and while requiring little or no involvement of specialized surveying expert services. Floor plans for existing buildings often cannot be found or are inaccurate due to modifications. Accordingly, a facility manager wishing to re-floor a space may, in the past, have spent thousands of dollars or more having a surveyor determine an accurate amount of floor space. Such time and expense may be avoided by employing a portable detection device. Similarly, a floor covering merchant or installer may use a portable detection device to accurately assess a layout, the square footage requirements, etc., to reduce the time and expense of otherwise obtaining such information.

An infrared detector or other scanning detector employed by an assigning or mapping device may detect the presence and location of one or more of walls, partial walls, workstations, tables, posts, furniture, or any other obstacle that is in the beam. The absence of the presence of such obstacles can be used to detect open space. For example, being able to detect a wall four feet to the right may indicate that there is open space in between the device and the wall at the time when that detection is made. An automatically detected layout may be cleaned up manually to address anomalies such as those that may occur when the device encounters a glass wall, etc.

Figure 2:
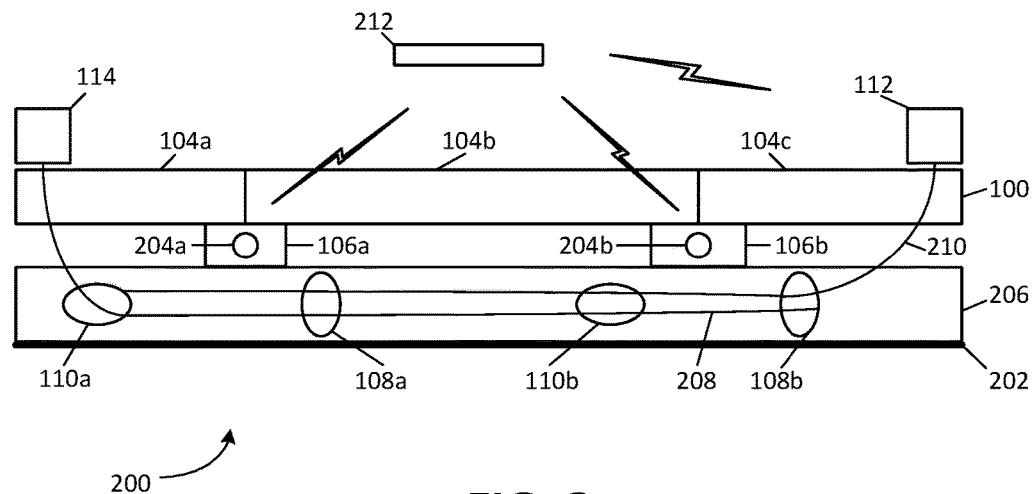
FIG. 2 is side, schematic view of a floor covering system with sensors according to one example.
Figure 3:
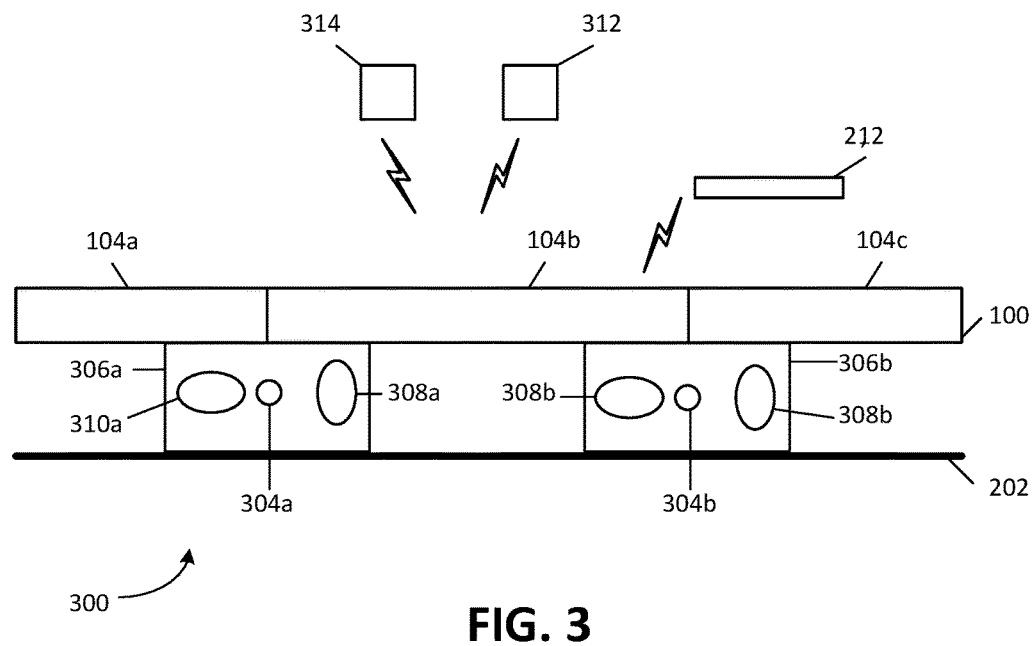
FIG. 3 is a side, schematic view of a floor covering system with sensors according to another example.

FIG. 2 is a side, schematic view of a floor covering system 200 with sensors according to one example. FIG. 3 is a side, schematic view of a floor covering system 300 with sensors according to another example. The components shown in FIGS. 2 and 3 are not to scale, but rather are schematically illustrative of components and possible positions of these components in floor covering systems.

The system 200 of FIG. 2 includes different layers. One layer is a floor 202, which is covered, at least partially, by the other layers. The top layer is a floor covering, such as floor covering 100 from FIG. 1 formed by tiles 104a-c. Connecting the tiles 104a-c are tile connectors 106a-b, which form a layer between the floor covering 100 and the floor 202. Included in the tile connectors 106a-b are location-tracking sensors that are RFID sensors 204a-b. Between the tile connectors 106a-b and the floor 202 is another layer that includes an underlayment 206 with force sensors that are accelerometers 108a-b and pressure sensors that are piezoelectric sensors 110a-b. The underlayment 206 may be a thin film that can be rolled up and transported using common carriers. Examples of material from which the underlayment 206 is made include foam. In one example, the underlayment 206 has a thickness of 3 mm or less. The underlayment 206 may be made to avoid being too resilient as the tiles 104a-c may tend to walk apart over too much deflection.

A controller system 112 and a power source system 114 are positioned above the top surface of the floor covering 100. In other examples, the controller system 112 or the power source system 114 is positioned below the top surface of the floor covering 100. The power source system 114 can provide power to the accelerometers 108a-b and the piezoelectric sensors 110a-b over a power cable 208 that can be ran, at least mostly, under the floor covering 100. In some examples, the RFID sensors 204a-b are active sensors, or are another type of wireless transmitters, that can be powered via power cable 208. The controller system 112 can receive data from the accelerometers 108a-b and the piezoelectric sensors 110a-b over a communication cable 210 that can be ran, at least mostly, under the floor covering 100. Although one power cable 208 and one communication cable 210 is shown, each of the power cable 208 and the communication cable 210 can be more than one cable. The cables can be designed such that the cables are as unnoticeable and unobtrusive in the floor covering installation as possible.

Embedded in, adhered to, or printed on the underlayment 206 can be circuits, wireless, tracers, etc. that include the accelerometers 108a-b, piezoelectric sensors 110a-b, power cable 208, and communication cable 210. In some examples, the floor covering system 200 can be pre-designed to avoid requiring electrical component installation at the same time that the floor covering 100 is installed. For example, the underlayment 206 can be a sufficient size to cover an average-sized room (e.g., 12 ft by 14 ft) with connections for the components pre-planned. The system can be modular. For example, the underlayment 206 can be made in drops (e.g., six foot drops) and stabilized in the center of the room to establish a seam parallel to one wall of the room. A second drop can be positioned next to the first drop and attached to the first drop using adhesive strip or tape. The connection can be predesigned such that the installation can be performed without much alteration to a normal installation and without requiring an electrician to assemble the system. Connections and terminals can be intuitive and not allow for an incorrect assembly. In one example, the system can be low voltage and can use flat wires embedded in the underlayment 206 or printed in carbon tracers onto the underlayment 206. The power source system 114 can convert or generate power and transport the power over the power cable 208. The power source system 114 and the power cable 208 can be designed to do so without outputting heat above a threshold temperature to avoid causing the floor covering system 200 to soften or change physical properties of the finish. In one example, the threshold temperature is 115° F.

A reader 212, such as an RFID reader, may be mobile and can be used to wirelessly integrate or receive data from the RFID sensors 204a-b and wirelessly communicate the data to the controller system 112. In other examples, the reader 112 can communicate the data to the controller system 112 over a wired connection or through a port.

The system 300 of FIG. 3 also includes different layers. One layer is the floor 202, which is covered, at least partially, by the other layers. The top layer is a floor covering, such as floor covering 100 from FIG. 1 formed by tiles 104a-c. Connecting the tiles 104a-c are tile connectors 306a-b, which form a layer between the floor covering 100 and the floor 202. Included in the tile connectors 306a-b are location-tracking sensors that are RFID sensors 304a-b, force sensors that are accelerometers 308a-b, and pressure sensors that are piezoelectric sensors 310a-b. In some examples, the accelerometers 308a-b and the piezoelectric sensors 310a-b are coupled to or formed on the tile connectors 306a-b using thin film technology or three-dimensional technology. A controller system 312 and a power source system 314 are positioned above the top surface of the floor covering 100. A reader 212 can wirelessly receive data from the RFID sensors 304a-b and communicate the data to the controller system 312.

The accelerometers 308a-b and the piezoelectric sensors 310a-b can communicate wirelessly with the controller system 312 and can receive power wirelessly from the power source system 314. In some examples, the piezoelectric sensors 310*a-b* can also generate power from impacts of foot traffic on the floor covering 100 or otherwise to provide power to the accelerometers 308*a-b* directly or through a battery (not shown) that may also be positioned below the top surface of the floor covering 100.

Figure 4:
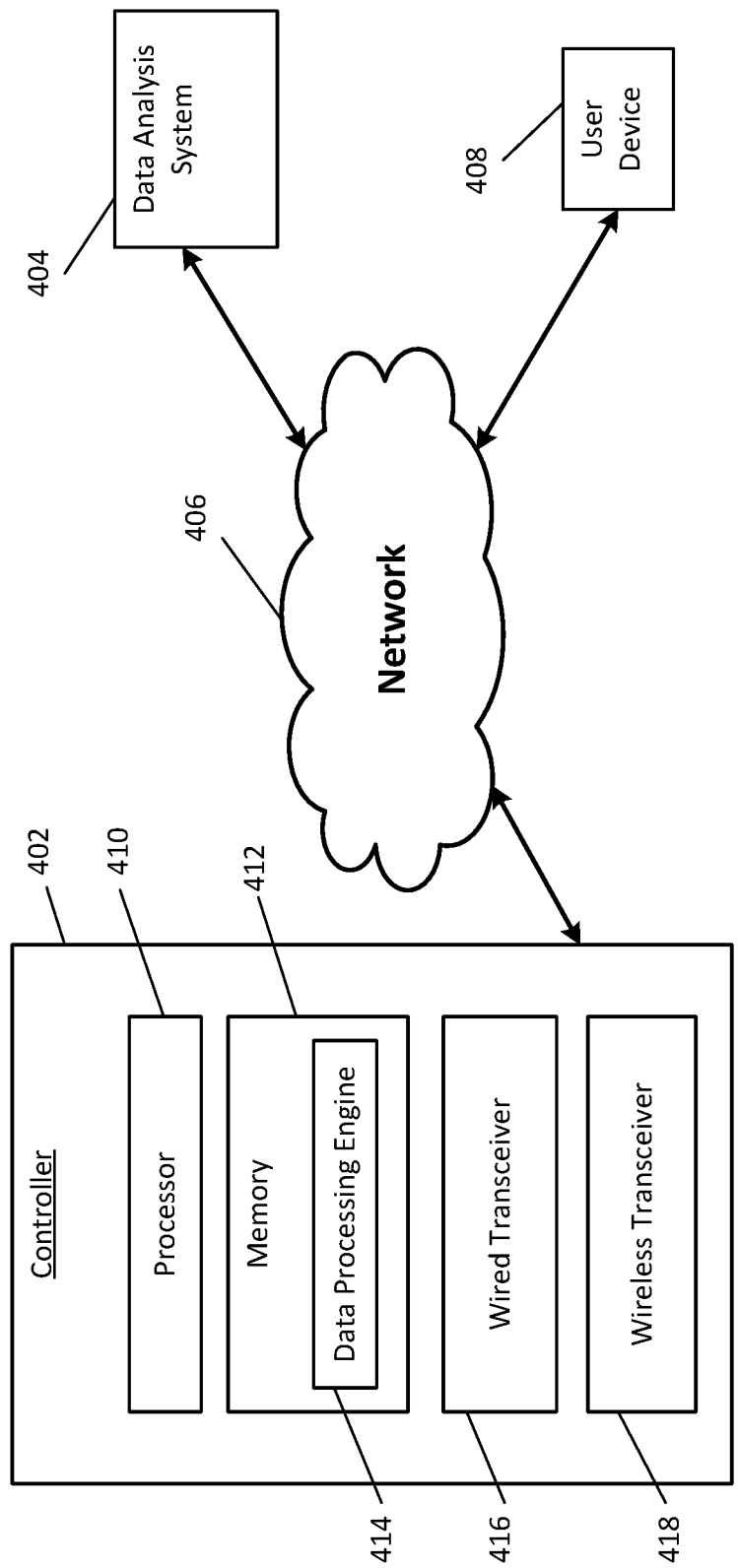
FIG. 4 is a system block diagram of a controller and analysis system for a floor covering system according to one example.

FIG. 4 is a system block diagram of a controller system, which may correspond to the controller system 112 or 312 from FIGS. 1-3. The controller system includes a controller subsystem 402 and a data analysis system 404 that can communicate over a network 406. The controller subsystem 402 or the data analysis system 404 may also communicate with a user device 408 through the network 406.

Examples of the user device 408 include a mobile phone, a home phone, a desktop or laptop computer, tablet, smart phone, a separate system, or any communications device. A communications device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, or any other device that can be used to generate input events in response to physical actions by a user of a computing device, or a microphone. Non-limiting examples of output devices include an LCD screen, an external monitor, a speaker, or any other device that can be used to display or otherwise present outputs generated by a computing device.

The controller subsystem 402 includes a processor 410 and a memory 412 that is a non-transitory medium with program code, such as a data processing engine 414, that is executable by the processor 410 for causing the controller subsystem 402 to perform certain operations. The controller subsystem 402 also includes a wired transceiver 416 and a wireless transceiver 418 for communicating with sensors or with components via the network 406. In some examples, the controller subsystem 402 includes one of the wired transceiver 416 or the wireless transceiver 418, but not both. The data processing engine 414 can be executed to cause the controller subsystem 402 to receive data from sensors, process the data into selected formats, and provide the data to the data analysis system 404. The data processing engine 414 may also be executed to cause the controller subsystem 402 to receive responses from the data analysis system 404 and to output an alert to the user device 408 based on the responses. The data analysis system 404 can include similar components as the controller subsystem 402, but it can include a data analysis engine that can analyze data from the sensors and determine whether alerts should be outputted. In some examples, the controller subsystem 402 includes the data analysis engine in memory 412 and there is not a separate data analysis system 404.

In one example, the controller subsystem 402 receives location data, pressure data, and force data associated with an event occurring in a room. The location data can be received from location-tracking sensor that is a wireless transmitter on a tile connector that connects tiles to form a floor covering for a floor of the room. The tile connector is between a top surface of the floor covering and the floor. The pressure data can be received from a pressure sensor, such as a piezoelectric sensor, positioned between the floor covering and the floor. The force data can be received from a force sensor, such as an accelerometer, positioned between the floor covering and the floor. The controller 402 can provide the data to the data analysis system 404, which can analyze the location data, the pressure data, and the force data to determine the event is occurring. The data analysis system 404, or the controller 402 in response to results of the analysis from the data analysis system 404, can output an alert to the user device 408 to indicate that the event is occurring.

Any suitable computing system or group of computing systems can be used to implement the controller subsystem 402 and the data analysis system 404. In one embodiment, one or more computer servers are used for one or both of the controller subsystem 402 and the data analysis system 404. A server can include a processor, such as processor 410, that is communicatively coupled to memory, such as memory 412, and that executes computer-executable program code or access information stored in the memory. The processor may include a microprocessor, an application-specific integrated circuit ("ASIC"), a state machine, or other processing device. The processor can include any of a number of processing devices, including one processing device. Such a processor can include or may be in communication with a computer-readable medium storing instructions that, when executed by the process, cause the processor to perform the operations described herein.

The memory can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler or an interpreter from code written in any suitable computer-programming language.

The server may also include a number of external or internal devices such as input or output devices. For example, the server may have input/output ("I/O") interface that can receive input from input devices or provide output to output devices. A bus can also be included in the server. The bus can communicatively couple one or more components of the server. The program code may be resident in the memory or any suitable computer-readable medium and may be executed by the processor or any other suitable processor. In additional or alternative embodiments, program code can be resident in a memory that is accessible via a data network, such as a memory accessible to a cloud service.

The server can also include at least one network interface device, such as wired transceiver 416 or wireless transceiver 418. The network interface device can include any device or group of devices suitable for establishing a wired or wireless data or telephone connection to one or more networks or to the sensors. Non-limiting examples of a network interface device include an Ethernet network adapter, a modem, or the like. A server can transmit messages as electronic or optical signals via the network interface device.

Figure 5:
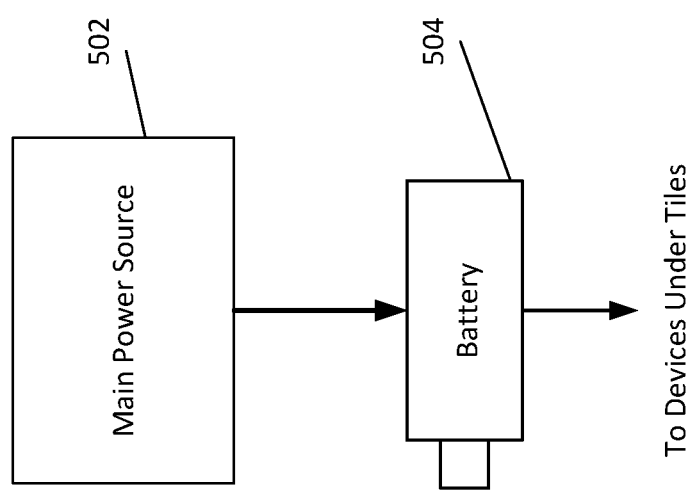
FIG. 5 is a block diagram of a power source system for a floor covering system according to one example.

FIG. 5 is a block diagram of a power source system, such as power source system 114, 314 from FIGS. 1-3, for a floor covering system according to one example. The power source system includes a main power source 502 and a battery 504. The main power source 502 may be AC/DC low voltage for continuous power. The battery 504 can be charged by the main power source 502 and provide power to sensors using wired connection or a wireless connection. When using a wireless connection, the battery 504 may provide power to a transmitter that transmit the power to the sensors. By using a battery 504 between the main power source 502 and the sensors, disruption in power to sensors as a result in outages at the main power source 502 can be minimized. In other examples, only one of a main power source 502 or a battery 504 (e.g., charged by piezoelectric sensors or another source) is used, rather than both. In some embodiments, the power source system does not include the battery 504. In some examples, power from the power source system supplements power from piezoelectric sensors.

Sensors can receive power from the battery 504 and perform operations. Sensors may be active all the time and continuously using power. Regardless of how power is supplied, it may be beneficial to reduce the energy output of the sensors. This may be facilitated by allowing the sensing circuit to sleep during particular times. Sensing circuits may be programmed to only be active during particular times of day. Sensing circuits may be programmed to wake up at appropriate times and go back to sleep afterwards. In one embodiment, vibration wakes up the circuit, the circuit converts the vibration information into a signal that it sends, and then the circuit shuts down to conserve power.

Piezoelectric power may be used to additionally or alternatively turn a sensor's battery on and off. This may extend the life of the battery while still allowing it to provide power to the sensor at appropriate times.

Fall Detection Examples

The following describes certain examples of using a sensor system for detecting fall events. Various aspects of the examples may be performed by the systems and components described with reference to FIGS. 1-5.

Fall detection can be based at least in part on detection of vibrations on a floor surface. One or more accelerometer sensors can be positioned within, on, or under a floor surface to detect such vibrations. Information about detected vibrations can be assessed to identify footfalls, identify falls, identify floor impacts of other types, distinguish between footfalls, falls, and impacts of other types, and many other things. One embodiment uses multiple accelerometer sensors that each comprise an accelerometer, time stamping element, and that are small enough to be incorporated into or positioned on or under a floor covering surface. For example, accelerometer sensors can be provided as small, regularly spaced, relatively flat and thin adhesive based connectors that are also used to connect carpet tiles together, such as in a Tactiles® connector available from Interface, Inc. An accelerometer circuit and an associated electrical connection component or relatively small size may be preferable to reduce or eliminate the possibility of disturbing the relatively flat surface of the floor.

Information can be compiled or automatically analyzed by a computer device to detect footfalls, human falls, and other impacts. An accelerometer circuit may convert sensed vibrations into information into about frequency, direction, and amplitude. This information can then be sent via a communications network, e.g., through wires, a Wi-Fi network, or otherwise, to an analysis system. The analysis system may compile information about frequency, direction, and amplitude from one or more sensors to identify where an impact occurred, the type of impact, characteristics of the impact. Impacts having certain characteristics may be determined to be a likely human fall. In one embodiment, input from three sensors is identified as having the same frequency and thus determined to be associated with the same impact. The additional sensor information about the impact relating to direction and amplitude can then also be used along with the frequency information to identify where the impact occurred, e.g., through triangulation, and to predict characteristics of the impact. As a specific example, a human falling on a carpet tile installation over a concrete slap will produce vibrations in the slab that has a frequency that is generally based on impact characteristics (e.g., how hard a person falls) and the size of underlying concrete slab. The vibration can also have an amplitude that can diminish based on distance away from impact. If three accelerometers are in range, each can detect the frequency and a different amplitude (if at different distances) and a direction from which the vibration came. All three of those vibration data points together may be used to identify the spot that human fall occurred. The number and position of the sensors can be selected to detect with a desired level of precision where and when the impact occurred.

Processing data to detect, locate, or classify impacts can be shared between the sensor chips and a more centralized or otherwise separate data analysis computing device. Such processing can be allocated between sensor chips and the data analysis computing device in whatever manner is appropriate for the particular system configuration. For example, in systems in which it is desirable to have non-wire powered chips (battery, piezoelectric, etc.), it may be desirable to have as much processing as possible performed by the data analysis component to minimize power requirements of the sensor chips.

Impact detection devices may be incorporated into carpet tiles or in small, regularly spaced, relatively flat and thin adhesive-based sensors that are attached via the adhesive to the undersides of carpet tiles. Such adhesive-based sensors may (or may not) also be used to connect carpet tiles to one another, for example, by implementing vibration detection technology into a Tactiles® connector available from Interface, Inc. To incorporate an impact detection device into a carpet tile, the backing of the carpet tile may be preformed or routed to provide a space for the device or a wiring pattern for communication or power wiring that is run through such wiring pattern to one or more collection points at the sides of the room or elsewhere. A plastic pad may also be used to protect the sensor device.

A floor impact detection method may involve detecting an impact, identifying the impact, and notifying an appropriate person or persons of the impact. This may involve positioning sensor devices near walls and in other strategic locations to ensure sufficient coverage for triangulation of impact locations anywhere in the room, associating a time stamp with the detections of vibrations, triangulating the location of impact based on information about the vibrations from multiple sensors, and sending text, e-mail, phone, or other notifications to appropriate persons. The notification may identify a time of the occurrence of the impact. The notification may identify the type of the impact. The type of impact may be determined based on the characteristics of the vibrations. For example, vibrations above a predetermined threshold may be determined based on past experience to be a likely human fall or other similar hard impact. The system may select a threshold based on the characteristics of the human expected to use the floor surface. For example, a 90-pound resident's room may be configured with a different threshold than a 250-pound resident's room in an elder care facility.

Information about impacts may also be used to identify and track activity. For example, floor sensors may be used to monitor for unusual or anomalous activity by a resident of an institution, for example to identify, based on detected movement, that the resident walked in a closet and has remained there for two hours. In the case of a fall, the system may monitor for subsequent movement, e.g., looking for signs of further movement indicating that the individual is or is not still at the location of the fall. Sensors can also be used to track movements of individuals and learn patterns to identify anomalies based on deviations from such patterns.

As a specific example, a system may be programmed to monitor for signs of pacing in front of a window as a sign of a particular mood or mental issue. Impact characteristics may also be used to identify individuals who may be associated with a particular gate, steed, or other movement characteristic. Impact characteristics of particular individuals may be monitored over time to monitor for changes in health or physical condition. For example, changes in speed, gait, walking pattern, etc., may indicate sickness, osteoporosis, mental illness, etc. In the commercial context, movement of individuals around a store or other shopping or entertainment environment may be tracked to assess the effectiveness of advertising displays, particular floor layouts, lighting, etc. Also, the system may monitor for anomalies as a form of self-diagnosis, detecting sensor device malfunction, breakage, and areas of no coverage.

Floor sensing systems may be advantageous in facilitating assisted living care in dedicated facilities and in the homes of those for whom care is being provided. For example, sensors may be positioned throughout the floor of a three-room apartment of an elderly resident at an assisted living community. A monitoring system may receive information from the sensors and over time determine the resident's walking pattern, e.g., where the resident typically walks after getting out of bed, when the resident fixes coffee and has breakfast, where the resident typically walks after having breakfast, etc. The system can recognize anomalies, for example, noting that the coffee machine is no longer being visited based on that location in the kitchen no longer being accessed. In the circumstance of a fall, the larger vibration can be identified as a potential fall, and automatic notifications can be sent to assisted-living staff and loved ones of the residents. Notification text may vary and may be varied over time or tailored to the specific incident, for example, stating "there is a chance that your grandmother just fell, why don't you give her a call or stop by." If the assisted person is in an assisted-care facility, a message may also be sent to a nursing station. This may improve response time so that the person is not laying on the floor until being discovered during the nurse's next rounds or otherwise.

Floor sensors may be provided as part of a temporary or otherwise removable floor surface installation. For example, a carpet tile installation may be installed in the home of a person who lives alone but who could use some closer monitoring. A temporary floor, e.g., a non-glue carpet tile installation, can be installed to (a) provide additional padding to prevent injury in the event of a fall or (b) to include sensors to help detect impacts and the associated falls, footfalls, behavioral patterns, etc. This may provide a cheaper or more desirable option for a person requiring some monitoring or occasional assistance but who does not want to pay for (or need) full time residency in an assisted-living facility.

Floor sensors may be positioned on, in, or under carpet, vinyl flooring such as luxury vinyl plank (LVP) flooring, and other types of floor surfaces, or can be positioned on, in, or under a moisture barrier, cushion, or other underlayment. Including sensors as part of a flooring surface (e.g., in or attached to tiles themselves or connectors used to connect the tiles) can facilitate simpler installation since the installer may not be required to install the sensors separate from what they would do otherwise to install the flooring surface.

Sensors may be attached to carpet tiles prior to being provided at an installation site. For example, sensors may be implanted in carpet tiles by cutting small, e.g., quarter size, pieces out of backing out of the tiles, while leaving the face cloth. A chip can then be inserted and tape or an adhesive connector such as a tactile may be positioned over the opening containing the sensor to hold the sensor in place, so it does not fall out during boxing, shipping, unloading from the delivery truck, etc. Such sensors may not require wired connections. If, however, such sensors require wired connections for power or network access, wires may extend from the covered sensors on the tile to allow for easy connection with power/network wires during installation. A machine may be used to route wire paths in the tiles. Embedding the sensors in a tile-backing void can ensure the flatness of the floor surface or allow for larger components to be used in the sensors without disturbing the flatness of the floor covering surface.

Touch sensors positioned in a flooring surface may be used for other purposes. For example, sensors may be positioned such that the floor can receive gesture input similar to a touch screen electronic device. In such cases, sensors may be densely positioned to allow for detection of more finely determined movements. In one example, sensors are positioned every half inch. In one example, the sensors are used to allow the floor surface to be used as a touch input to control a computer device or gaming console. In one example, the sensors are used in a system that tracks athletic performance, exercise performance, military training exercises, or dance performance. In one embodiment, the sensors allow the floor to be used as a video game control.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Although RFID tags, accelerometers, and piezoelectric sensors are described and shown as examples, other types of sensors than these examples can be used to provide location data, force data, and pressure data. In some examples, force data and pressure data may be detected and provided from the same sensor. For example, a sensor may be configured to detect both force data and pressure data. In still other examples, a single sensor may be configured to detect location data, force data, and pressure data.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A floor covering system, comprising:
   at least one tile connector with a wireless transmitter and positionable between a floor and a floor covering to connect tiles of the floor covering together;
   a piezoelectric sensor positionable between the floor and the floor covering;
   an accelerometer positionable between the floor and the floor covering; and
   a controller configured for receiving data from the piezoelectric sensor, the wireless transmitter, and the accelerometer, the controller including or being communicatively coupled to a data analysis system that is configured to analyze the location data, the pressure data, and the force data to identify an event in a room with the floor covering, as indicated by the location data, the pressure data, and the force data, wherein the controller is configured for communicating via a network with a device to output an alert of the event indicated by the location data, the pressure data, and the force data.

2. The floor covering system of claim 1, wherein the controller is configured for communicatively coupling to the accelerometer and the piezoelectric sensor by at least one communication cable.

3. The floor covering system of claim 2, further comprising a power source configured for coupling to the accelerometer and the piezoelectric sensor by at least one power cable.

4. The floor covering system of claim 3, wherein the power source includes a main power source and a battery that is configured for coupling to the accelerometer and the piezoelectric sensor.

5. The floor covering system of claim 3, wherein the at least one communication cable and the at least one power cable are configured to at least partially traverse under a surface of the floor covering.

6. The floor covering system of claim 1, wherein the piezoelectric sensor and the accelerometer are associated with one or more transmitters, the controller being configured for communicatively coupling to the piezoelectric sensor and the accelerometer wirelessly through the one or more transmitters.

7. The floor covering system of claim 6, further comprising a power source configured for providing power wirelessly to the piezoelectric sensor and the accelerometer.

8. The floor covering system of claim 1, wherein the wireless transmitter is a radio-frequency identification (RFID) transmitter, the controller being configured for communicatively coupling to the RFID transmitter through an RFID reader that wirelessly receives data from the RFID transmitter.

9. The floor covering system of claim 1, further comprising:
   an underlayment positionable between the at least one tile connector and the floor, the underlayment including the piezoelectric sensor.

10. The floor covering system of claim 1, wherein the at least one tile connector is a tactile that includes the accelerometer and the piezoelectric sensor.

11. The floor covering system of claim 1, wherein the piezoelectric sensor is configured for responding to forces impacting a surface of the floor covering by outputting a power signal for powering the accelerometer.

12. A floor installation, comprising:
    a plurality of tiles forming a floor covering that covers at least part of a floor, at least some tiles of the plurality of tiles being connected together by tile connectors that are positioned between the plurality of tiles and the floor, the tile connectors including location-tracking sensors configured to provide location data to a controller;
    at least one piezoelectric sensor positioned between the floor and the floor covering and configured to provide pressure data to the controller;
    at least one accelerometer positioned between the floor and the floor covering and configured to provide force data to the controller; and
    the controller configured for receiving data from the at least one piezoelectric sensor, the location-tracking sensors, and the at least one accelerometer, the controller including or being communicatively coupled to a data analysis system that is configured to analyze the location data, the pressure data, and the force data to identify an event in a room with the floor covering, as indicated by the location data, the pressure data, and the force data, wherein the controller is configured for communicating via a network with a device to output an alert of the event indicated by the location data, the pressure data, and the force data.

13. The floor installation of claim 12, wherein the location-tracking sensors are radio-frequency identification (RFID) sensors,
    wherein the controller is communicatively coupled to a reader configured for wirelessly receiving the location data from the RFID transmitters, the floor installation further comprising:
    a power source system configured for providing power to the at least one piezoelectric sensor and the at least one accelerometer.

14. The floor installation of claim 13, further comprising:
    a power cable coupling the power source system to the at least one piezoelectric sensor and the at least one accelerometer, the power cable being at least partially below a top surface of the floor covering; and
    a communication cable communicatively coupling the controller to the at least one piezoelectric sensor and the at least one accelerometer, the communication cable being at least partially below the top surface of the floor covering,
    wherein the reader is configured to wirelessly transmit the location data from the RFID transmitters to the controller.

15. The floor installation of claim 13, wherein the power source system is configured for wirelessly providing power to the at least one accelerometer and the at least one piezoelectric sensor,
    wherein the controller is configured for wirelessly receiving data from the at least one accelerometer and the at least one piezoelectric sensor.

16. The floor installation of claim 12, wherein the tile connectors with location-tracking sensors form a grid over the floor.

17. The floor installation of claim 12, wherein the at least one piezoelectric sensor and the at least one accelerometer are positioned on a tile connector.

18. The floor installation of claim 12, further comprising an underlayment positioned between the tile connectors and the floor, the underlayment including the at least one piezoelectric sensor and the at least one accelerometer.

19. A method, comprising:

receiving location data associated with an event occurring in a room from a wireless transmitter on a tile connector that connects tiles to form a floor covering for a floor of the room, the tile connector being between a top surface of the floor covering and the floor;

receiving pressure data associated with the event occurring in the room from a piezoelectric sensor positioned between the floor covering and the floor;

receiving force data associated with the event occurring in the room from an accelerometer positioned between the floor covering and the floor; and analyzing, by a data analysis system included in or communicatively coupled to a controller, the location data, the pressure data, and the force data to determine the event is occurring and outputting, by communicating via a network, an alert to a user device to indicate that the event is occurring.

* * * * *